Sept. 4, 1962     R. H. GRAHAM     3,052,616
REACTOR CONTROL DEVICE
Filed March 24, 1958
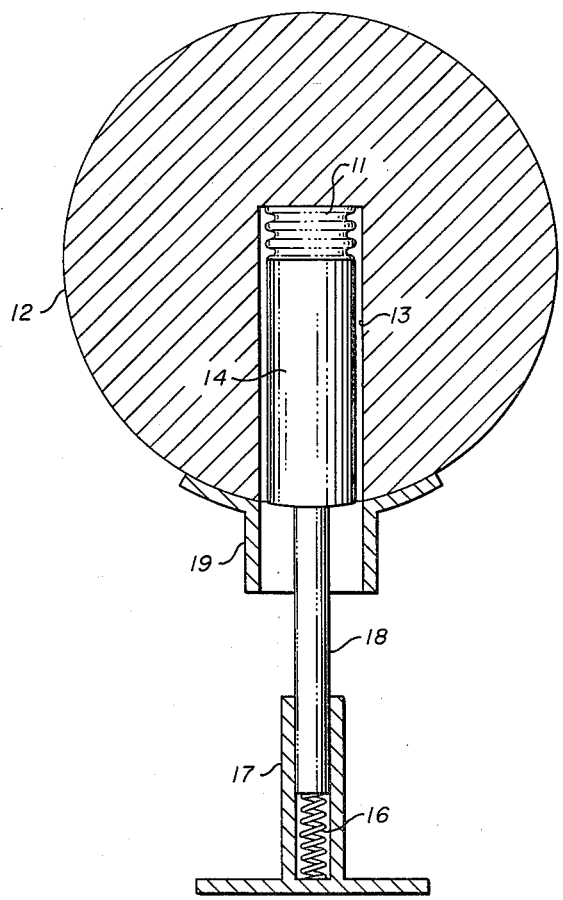
INVENTOR.
RICHARD H. GRAHAM
BY
*Roland A. Anderson*
ATTORNEY.

3,052,616
REACTOR CONTROL DEVICE
Richard H. Graham, Los Altos, Calif., assignor, by mesne assignments, to the United States of America as represented by the United States Atomic Energy Commission
Filed Mar. 24, 1958, Ser. No. 723,603
4 Claims. (Cl. 204—193.2)

The present invention relates to nuclear reactor control devices and, more particularly, to a mechanical, non-electrical, automatic reactor control device which depends upon simple physical phenomena for its operation.

Many nuclear reactors are fundamentally unstable devices in that they have positive temperature coefficients of reactivity, i.e., an increase of temperature in the reactor core results in an increased fission rate and a further rise of temperature. In such reactors the neutron flux rate, and hence the fission rate, are capable of an extremely rapid and dangerous increase in a very short time with an attendant increase in operating temperature to values greater than the maximum design limit. Accordingly, nuclear reactors conventionally have associated control systems to provide smooth, steady, and safe operation under the circumstances for which the device was designed. The control system usually includes provision for rapidly reducing the fission rate to prevent accidents as would occur when operating temperatures exceed the design limits.

Nuclear reactors have heretofore been commonly controlled by fuel or poison rods in the reactor core driven by electromechanical devices. The devices are actuated by electronic tubes which sense the reactor's radiation and send a suitable driving signal to a control actuator. When the radiation exceeds a predetermined level, commensurate with the design temperature limit of the reactor, the signal is such as to cause the control actuator to withdraw the fuel rods from the reactor core, or alternatively, to insert the poison rods into the core, whereby the radiation, and therefore the temperature, is correspondingly reduced to a safe level. Such conventional electromechanical control systems, although being sensitive and accurate, include various electrical components (e.g., tubes, motors, and the like) which are subject to frequent breakdown and therefore necessitate intensive maintenance. Moreover, inasmuch as the control system components may break down without warning, back up control systems must be employed to minimize the possibility of hazardous, unsafe reactor operation. Common electromechanical reactor control systems are accordingly not readily adapted to reliable unattended service for prolonged periods of time nor do they facilitate a compact reactor design due to the attendant additional bulk of the requisite back up control system. Electromechanical control systems are thus disadvantageous for employment in reactors for nuclear propelled aircraft, space satellites, and the like, wherein the capabilities of unattended operation and compactness are extremely desirable.

The present invention provides a completely mechanical control system for nuclear reactors which depends for its operation upon simple physical phenomena, such as phase change to the vapor state or thermal expansion of liquids. The present control system does not include electrical or electromechanical devices subject to physical or electrical interference or breakdown and hence overcomes many of the limitations and disadvantages of conventional electromechanical control systems.

It is accordingly an object of the present invention to provide an entirely mechanical compact reactor control device which is capable of reliable, prolonged, unattended operation.

Another object of the present invention is the provision of apparatus of the above-noted class which is actuated by simple physical phenomena.

Still another object of the present invention is to provide a large negative temperature coefficient of reactivity (i.e., a fission rate that decreases for increasing temperature) in a fundamentally unstable reactor.

Yet another object is the provision of a reactor control device which is totally contained within the reactor shield and is independent of external power supplies.

One other object of this invention is to provide mechanical non-electrical means for displacing fuel for reactor control in response to reactor temperatures in excess of the reactor design limits.

A further object of the present invention is to provide a control device for nuclear aircraft propulsion reactor service.

The invention, both as to its organization and method of operation, together with further objects and advantages thereof, will best be understood by reference to the following specification taken in conjunction with the accompanying drawing, of which the single FIGURE is a cross sectional view illustrating the control device of the present invention as employed to displace a fuel cylinder from a reactor core upon the occurrence of excessive temperatures therein.

Considering now the present invention in some detail and referring to the illustrated form thereof in the drawing, there is generally provided a temperature sensitive, entirely mechanical control device which is arranged to render the core of a nuclear reactor subcritical upon the attainment of over temperature therein. Basically, as is disclosed in detail in the reactor literature, the core of a nuclear reactor includes nuclear fuel, e.g., uranium, and a moderating material, e.g., graphite, in such proportions and geometrical arrangement that for a certain minimum size of the particular core (i.e., the critical size) a nuclear fission reaction is established therein which is exactly self-sustaining. In other words, the neutron production by fission is exactly balanced by neutron leakage and absorption in a reactor core of critical size. When the size of a reactor core is made greater than the critical size, i.e., super critical, the fission rate of the reaction increases rapidly with an attendant increase in the temperature within the reactor core. Conversely when the reactor core is made sub-critical the fission rate and core temperature rapidly decrease until the reaction is no longer sustained. The fission reaction rate may accordingly be controlled by appropriately varying the critical size of the reactor core and in this connection several alternatives are possible. For example, the reactor core may be made super critical or sub-critical by respectively increasing or decreasing the amount of nuclear fuel in the core above or below the critical amount of fuel. This is conventionally accomplished by providing fuel cylinders which are slideably mounted within internally extending channels in the reactor core and which may be inserted or withdrawn from the core to thereby alter the effective size thereof for control purposes. Alternatively, portions of the overall core including fuel and moderator may be removed from the remainder of the core or added thereto to alter the size of the core.

Proceeding now with a detailed description of a preferred embodiment of the present invention as illustrated in the drawing, the control device is seen to include an expansible housing, preferably an expansible bellows 11, disposed interiorly of a reactor core 12 within a fuel cylinder channel 13 provided therein. Bellows 11 is fabricated from a good thermally conducting structural material such as stainless steel and contains a temperature sensitive working fluid of a type subsequently described in pressure sealed relationship therein.

A fuel cylinder 14 is disposed in slideable engagement with channel 13 and is rigidly attached at its internal end to bellows 11 in axiail alignment therewith. Fuel cylinder 14 is in turn acted upon by an inwardly directed restoring force which urges the cylinder into channel 13 and inwardly against bellows 11 to a position of insertion within core 12 which is commensurate with the conduction of a fission reaction at the design operating temperature of the reactor. Such restoring force may be facilitated for example by means of a compressed spring 16 disposed within a rigid support housing 17 and acting upon cylinder 14 through an axial push rod 18.

In the event the temperature within reactor core 12 rises to a value greater than the design operating temperature, the working fluid within bellows 11 is effective in expanding same outwardly against fuel cylinder 14. The cylinder is thereby displaced out of core 12 resulting in a reduction in the nuclear fission rate therein and an attendant reduction of the core temperature to a safe value.

Fuel cylinder 14 is maintained in axial alignment with channel 13 at its position of outward displacement as by means of a guide sleeve 19 peripherally attached to core 12 in alignment with channel 13. Sleeve 19 is effective in preventing binding of the fuel cylinder 14 against the walls of channel 13 whereby the cylinder is free to move inwardly within the channel under the influence of the restoring force exerted by spring 16 and upon contraction of bellows 11 when the core temperature decreases below the design temperaturre. The control device of the present invention accordingly continuously regulates the temperature within core 12 to values approaching the design operating temperature. The control device in effect provides reactor core 12 with a large negative temperature coefficient where a fundamentally unstable reactor may be rendered self regulating to behave stably to exhibit stable operating characteristics.

Considering now preferred temperature sensitive working fluids as are contained within control bellows 11, it is to be noted that such fluids are capable of expanding the bellows to displace fuel out of the core in response to temperatures in excess of the core design operating temperature. One type of fluid which may be advantageously employed for the above purpose is that class of fluids which undergo a phase change from liquid to vapor at or near the design operating temperature limit of the particular reactor core in which employed. Such a phase change abruptly increases the pressure within bellows 11 to effect maximum extension thereof. The bellows thus displaces fuel cylinder 14 from the reactor core 12 when the temperature therein exceeds the predetermined operating limit. Conversely, when the temperature drops below the critical value which is equal to the boiling point of the working fluid, there is an inverse phase change from vapor to liquid resulting in an abrupt decrease in pressure within bellows 11 and contraction thereof. Spring 16 thus urges fuel cylinder 14 to its normal operating position within the reactor core against the contracted bellows. For a particular reactor core 12 having a design operating temperature limit within the range of approximately 1600° F. to 1700° F., examples of working fluids which may be employed in bellows 11 in accordance with the present invention include liquid sodium, which has a boiling point of 1616° F. at atmospheric pressure; and liquid zinc with a boiling point of 1665° F. In the event boiling points lower than those of the above working fluids are desired, suitable additives, such as potassium or cadmium, having slightly lower boiling points may be mixed with the liquid sodium or zinc in amounts as required to lower the boiling point of the resulting working fluid to the desired value.

It will be appreciated that in addition to the preferred embodiment described above, various alternative structures of the present invention are possible. For example, the control device of the present invention may be employed as hereinafter described to regulate the core temperature of a reactor by disassembling segments of the core from the core proper. In this connection a special spherical core would be provided which is formed of at least one detached pole piece and a body portion. The core includes both fuel and moderating material in such proportions that the core is of supercritical size when the pole piece is assembled to the body portion and of subcritical size when the pole piece is disassembled therefrom. In the case of a nuclear aircraft propulsion reactor, the pole piece may be assembled to the body portion to facilitate start-up of the reactor as by means of pressure sensitive start up bellows. The start up bellows would be adapted to automatically urge the pole piece into assembly with the body portion as the propulsion vehicle ascended into space and the environmental pressure decreased. Temperatures in the reactor core could then be automatically controlled by a temperature sensitive control device in accordance with the present invention disposed between the body portion and pole piece and adapted to displace the latter upon the attainment of excessive core temperatures. The control device may be, for example, provided as an annular bellows containing a suitable temperature sensitive working fluid and secured to the face of the core body portion in intimate engagement with the pole piece. In response to excessive core temperatures, the bellows consequently expands against the pole piece to thereby disassemble same from the body portion and thus displace sufficient fuel from the core to render the core sub-critical.

As another alternative, a liquid fuel column may be employed in a reactor core with the fuel column adapted to expand in proportion to the core temperature and thereby displace sufficient fuel atoms from the core to create a large artificial negative temperature coefficient. More particularly, a hollow tube may be extended axially through the core with expansible bellows forming end closures coincident with the peripheral surfaces of the core. A suitable liquid metal alloy fuel having a positive coefficient of thermal expansion may then be contained within the tube between the bellows to provide the expansible liquid fuel column. Suitable liquid metal alloys which may be employed for the foregoing purpose include enriched uranium in aluminum, enriched uranium in beryllium, enriched uranium in mercury, and the like. Accordingly, as the temperature within the core increases, the liquid metal alloy fuel expands against the bellows. Fuel atoms are accordingly displaced from the reactor core resulting in a reduction in the fission rate and return of the core temperature to a safe value.

While the invention has been disclosed with respect to a single preferred embodiment, it will be apparent to those skilled in the art that numerous variations and modifications may be made within the spirit and scope of the invention, and thus it is not intended to limit the invention except as defined in the following claims.

What I claim is:

1. In a nuclear reactor core including a moderator and nuclear fuel with at least a portion of the fuel in the form of fuel cylinders internally slideable in and out of the core to vary the effective size thereof above and below critical size, said core having a maximum operating temperature limit less than temperatures corresponding to unsafe fission rates, the combination of a safety control device comprising at least one of the fuel cylinders of said core, an expansible housing disposed interiorly of the core with one end in abutment with an interior portion of the core and the other end attached to the internal end of said cylinder and in axial alignment therewith, said housing expansible coaxially toward said cylinder to move same outwardly from the core upon expansion, and a working fluid which changes from the liquid to the vapor phase at a temperature approximately equal to the maximum operating temperature limit of the core sealed within the housing.

2. In a safety device for a nuclear reactor, the combination comprising a nuclear reactor core having a maximum safe operating temperature limit, a nuclear fuel cylinder slideably disposed within said core and extending exteriorly therefrom, restoring force means exteriorly connected to said fuel cylinder and exerting an inwardly directed force thereon, an expansible bellows disposed interiorly of said core and coaxially secured to the internal end of said fuel cylinder, and a temperature sensitive working fluid hermetically sealed within said bellows and having a boiling point approximately equal to said maximum limit.

3. Apparatus for controlling the core temperature of a nuclear reactor to a safe level of from 1600 to 1700° F. comprising a nuclear reactor core having an exteriorly extending channel therein, an expansible bellows fabricated from thermally conducting structural material and disposed at the internal end of said channel, liquid sodium hermetically sealed within said bellows, an elongated nuclear fuel cylinder slideably disposed within said channel and rigidly attached at its internal end to said bellows in axial alignment therewith, and restoring force means exteriorly connected to said fuel cylinder and exerting an inwardly directed force thereon.

4. Apparatus for controlling the core temperature of a nuclear reactor to a safe level of from 1600 to 1700° F. comprising a nuclear reactor core having an exteriorly extending channel therein, an expansible bellows fabricated from thermally conducting structural material and disposed at the internal end of said channel, liquid zinc hermetically sealed within said bellows, an elongated nuclear fuel cylinder slideably disposed within said channel and rigidly attached at its internal end to said bellows in axial alignment therewith, and restoring force means exteriorly connected to said fuel cylinder and exerting an inwardly directed force thereon.

References Cited in the file of this patent

UNITED STATES PATENTS

| | | |
|---|---|---|
| 760,443 | Fulton | May 24, 1904 |
| 1,595,749 | Andersen | Aug. 10, 1926 |
| 1,602,352 | Foley | Oct. 5, 1926 |
| 2,456,907 | Berberich | Dec. 21, 1948 |
| 2,755,619 | Sheft | July 24, 1956 |
| 2,907,706 | Horning et al. | Oct. 6, 1959 |

FOREIGN PATENTS

| | | |
|---|---|---|
| 688,824 | Great Britain | Mar. 18, 1953 |

OTHER REFERENCES

Murray et al.: Nucleonics, vol. 13, No. 2, February 1955, page 18.